(12) United States Patent
Trnka et al.

(10) Patent No.: US 11,226,464 B2
(45) Date of Patent: Jan. 18, 2022

(54) TELECOMMUNICATIONS FAN-OUT ARRANGEMENT

(71) Applicant: CommScope Technologies LLC, Hickory, NC (US)

(72) Inventors: Mandy Lea Trnka, Lonsdale, MN (US); Scott L. Carlson, Bloomington, MN (US); Jaime Gonzalez Batista, Prior Lake, MN (US); Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/809,098

(22) Filed: Mar. 4, 2020

(65) Prior Publication Data

US 2020/0285016 A1    Sep. 10, 2020

Related U.S. Application Data

(60) Provisional application No. 62/815,143, filed on Mar. 7, 2019.

(51) Int. Cl.
*G02B 6/38* (2006.01)
*G02B 6/44* (2006.01)

(52) U.S. Cl.
CPC ......... *G02B 6/4477* (2013.01); *G02B 6/3857* (2013.01); *G02B 6/3878* (2013.01); *G02B 6/3889* (2013.01); *G02B 6/3891* (2013.01)

(58) Field of Classification Search
CPC .................................................. G02B 6/3878
See application file for complete search history.

(56) References Cited

U.S. PATENT DOCUMENTS

| 4,088,390 | A | * | 5/1978 | McCartney | G02B 6/383 |
| | | | | | 385/134 |
| 5,101,463 | A | * | 3/1992 | Cubukciyan | G02B 6/3831 |
| | | | | | 385/72 |
| 5,381,501 | A | * | 1/1995 | Cardinal | G02B 6/0006 |
| | | | | | 385/134 |
| 5,903,693 | A | * | 5/1999 | Brown | G02B 6/4471 |
| | | | | | 385/100 |
| 6,389,214 | B1 | * | 5/2002 | Smith | G02B 6/3878 |
| | | | | | 385/136 |
| 7,270,485 | B1 | * | 9/2007 | Robinson | G02B 6/4471 |
| | | | | | 385/136 |
| 2009/0060440 | A1 | | 3/2009 | Wright et al. | |
| 2010/0092136 | A1 | | 4/2010 | Nhep | |

(Continued)

FOREIGN PATENT DOCUMENTS

EP         0564207 A2  * 10/1993   ........... G02B 6/3839
WO    2017161310 A1    9/2017

*Primary Examiner* — Charlie Y Peng
(74) *Attorney, Agent, or Firm* — Merchant & Gould P.C.

(57) ABSTRACT

The present disclosure relates to a fan-out arrangement. The fan-out arrangement may include a main cable that includes a jacket containing a plurality of optical fibers and a plurality of breakout cables that receive the optical fibers of the main cable. The fan-out arrangement may include a fan-out device for transitioning the optical fibers from the main cable to the breakout cable. The fan-out device may include a fan-out housing that includes oppositely positioned first and second housing ends. The fan-out device may also include a fiber transition insert that mounts within the fan-out housing.

19 Claims, 12 Drawing Sheets

(56) References Cited

U.S. PATENT DOCUMENTS

2013/0183012 A1\* 7/2013 Cabanne Lopez ... G02B 6/4471
  385/100
2014/0037255 A1 2/2014 Mullaney et al.
2014/0193130 A1 7/2014 Mullaney et al.

\* cited by examiner

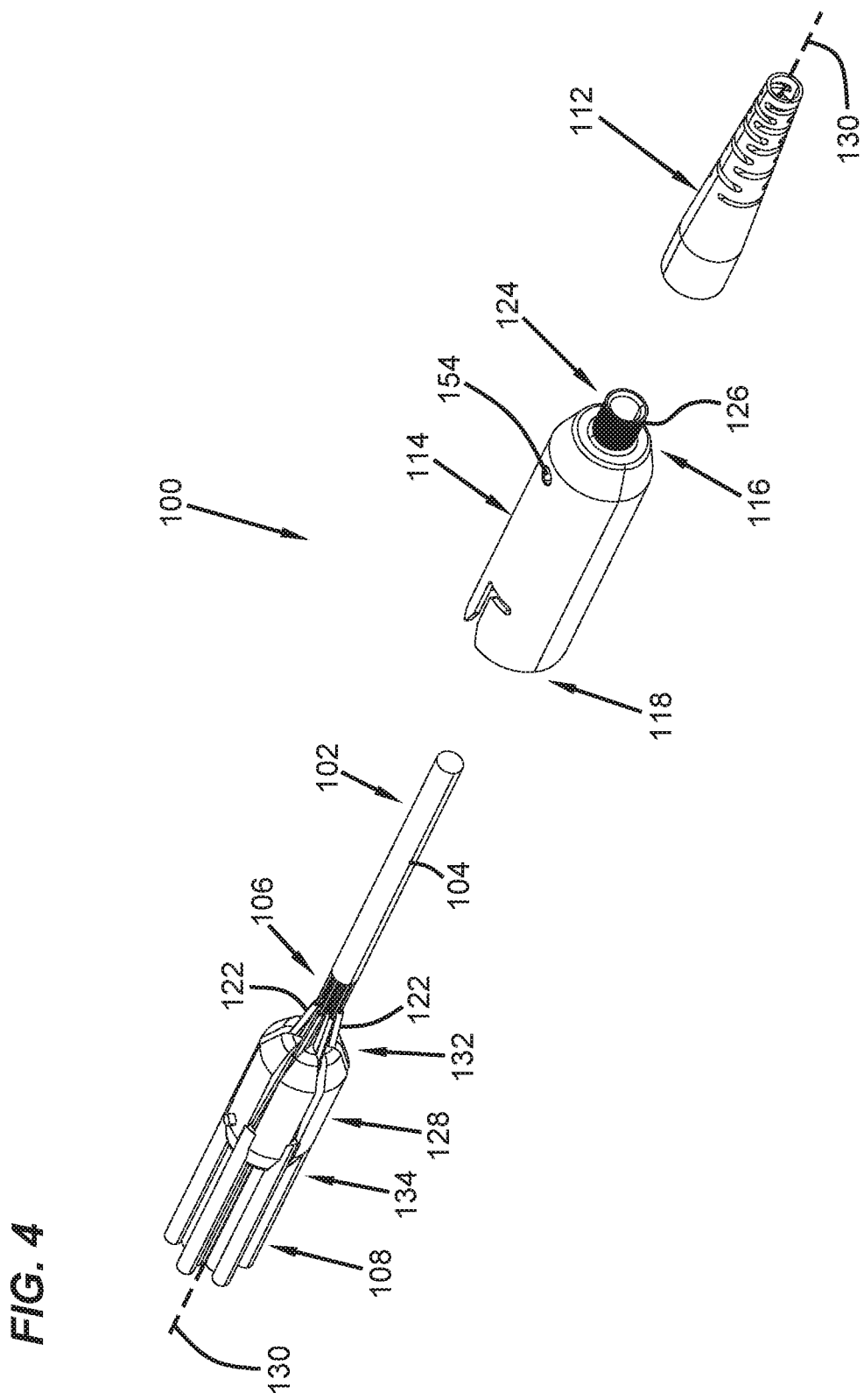

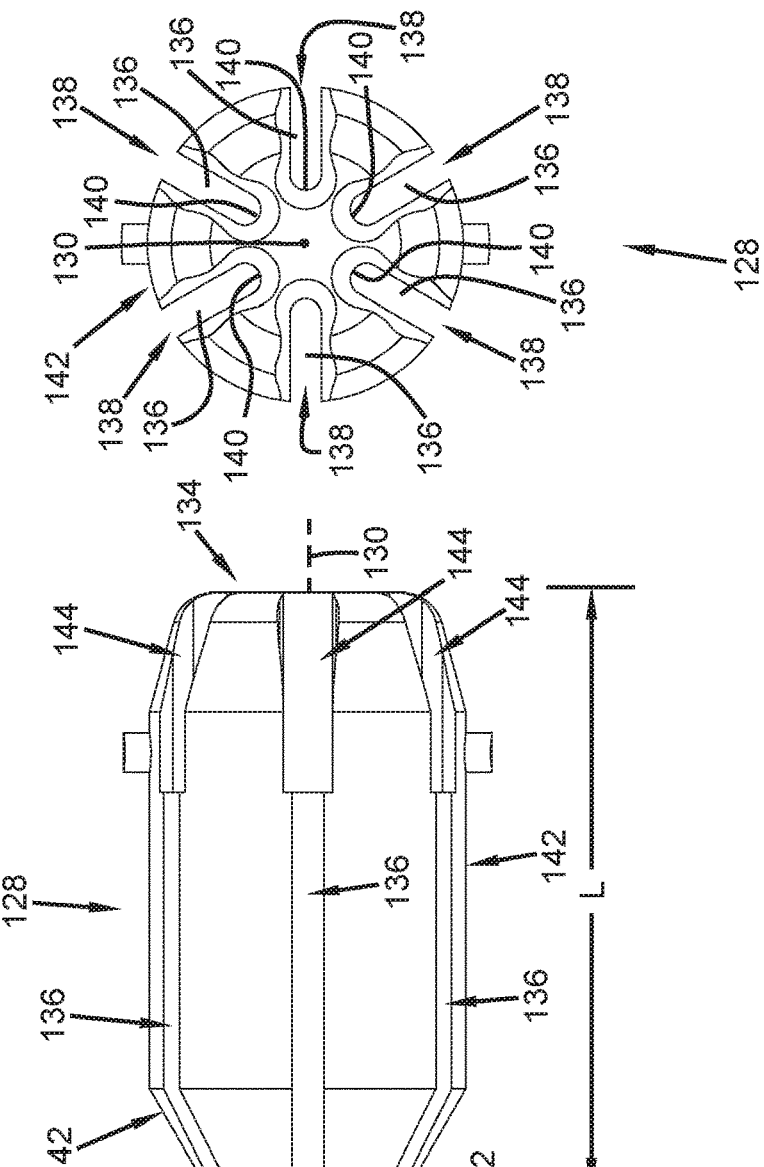

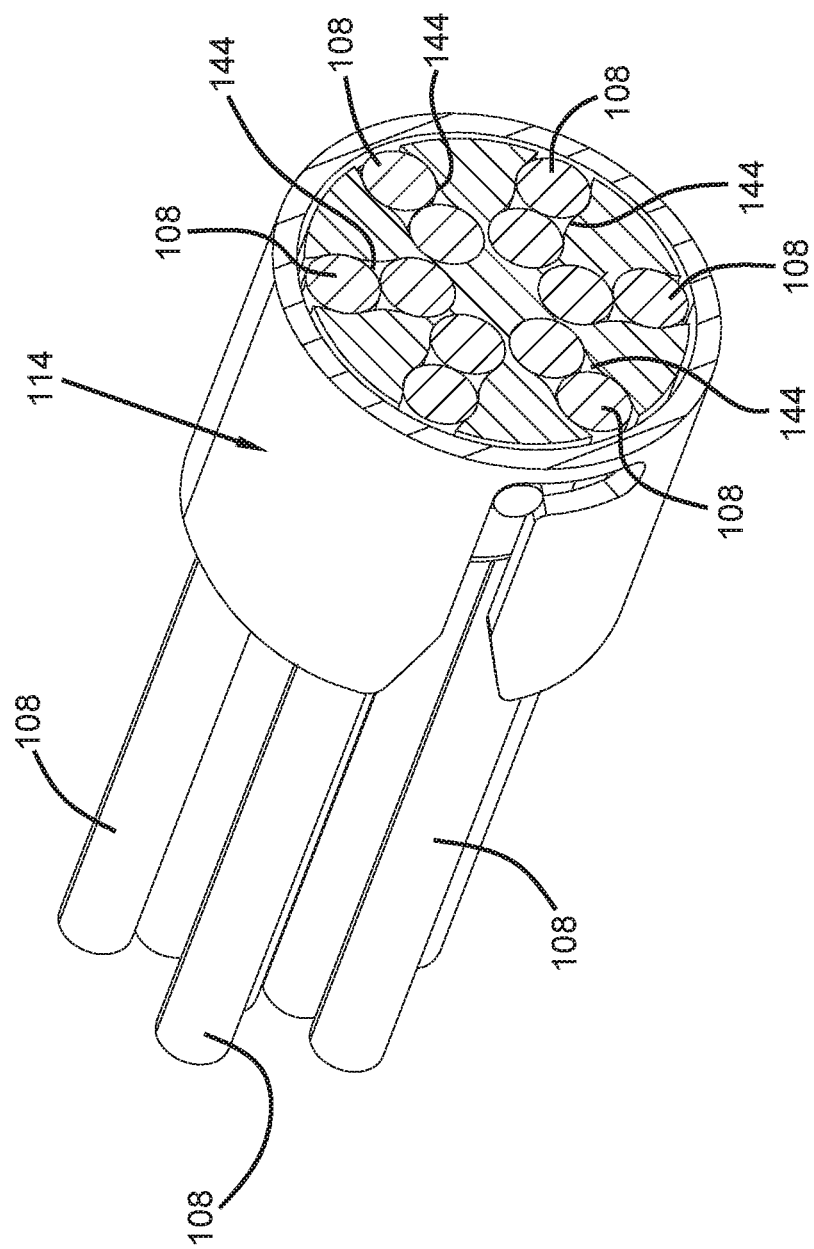

TELECOMMUNICATIONS FAN-OUT ARRANGEMENT

CROSS-REFERENCE TO RELATED APPLICATION(S)

This application claims the benefit of U.S. Provisional Application No. 62/815,143, filed Mar. 7, 2019, which application is hereby incorporated by reference in its entirety.

TECHNICAL FIELD

The disclosure relates to fan-out arrangements for fiber optic cables and components thereof.

BACKGROUND

Optical cable fan-outs are one of the components that are commonly used in optical fiber telecommunication systems. Optical fan-outs are a type of device that provides a physical transition between cabled fibers and individually jacketed and connectorized fibers. Optical fan-outs define a location where a single telecommunications cable including a plurality of signal-carrying members is fanned out or broken out into individual cables. The fan-out organizes optical fibers to facilitate management and maintenance. A technician can connect a cable fan-out to/on a fiber optic cable to manage various optical fibers.

There is a need for improved developments in this area.

SUMMARY

To manage transport and connection of optical fibers at a subsequent juncture point, optical fibers in a cable should be organized. Organizing optical fibers can include fanning out the optical fibers from a sheathed protection layer of the cable with a cable fan-out assembly. Once the optical fibers are fanned out, the optical fibers are preferably channeled in a selected arrangement. The disclosure is directed to a telecommunications fan-out arrangement for fanning out a multi-fiber cable into individual fibers; an optical fiber fan-out device; and a kit.

One aspect of the disclosure relates to a fan-out arrangement. The fan-out arrangement may include a main cable that includes a jacket containing a plurality of optical fibers and a plurality of breakout cables that receive the optical fibers of the main cable. The fan-out arrangement may include a fan-out device for transitioning the optical fibers from the main cable to the breakout cables. The fan-out device may include a fan-out housing that includes oppositely positioned first and second housing ends. The fan-out device may also include a fiber transition insert that mounts within the fan-out housing.

The fiber transition insert may be mechanically locked relative to the fan-out housing by a mechanical locking interface.

The fiber transition insert can define a plurality of transition slots that have lengths that extend from a first insert end to a second insert end. The optical fibers may be routed through the plurality of transition slots to transition from the main cable to the breakout cables.

The fiber transition insert may be inserted into the fan-out housing through the second housing end. The fiber transition insert may extend along a central insert axis between first and second opposite insert ends. The first insert end may face toward the main cable and the second inert end may face toward the breakout cables.

The plurality of transition slots may be circumferentially spaced about the central insert axis. The plurality of transition slots may have transverse cross-sectional profiles having open ends positioned opposite from closed ends. The plurality of transition slots may have depths that extend radially with respect to the central insert axis from the closed ends to the open ends. The open ends may face radially outwardly from the fiber transition insert and may be located at an outer boundary of the fiber transition insert.

Another aspect of the disclosure relates to an optical fiber fan-out device. The optical fiber fan-out device may include a fan-out housing that includes oppositely positioned first and second housing ends. The optical fiber fan-out device may also include a fiber transition insert that mounts within the fan-out housing. The fiber transition insert may be inserted into the fan-out housing through the second housing end.

The fiber transition insert may extend along a central insert axis between first and second opposite insert ends. The fiber transition insert may define a plurality of transition slots that have lengths that extend from the first insert end to the second insert end the plurality of transition slots may be circumferentially spaced about the central insert axis.

The fiber transition insert may being mechanically locked relative to the fan-out housing by a mechanical locking interface.

A further aspect of the disclosure relates to a kit. The kit may include a main cable that includes a jacket containing a plurality of optical fibers, a plurality of breakout cables that receive the optical fibers of the main cable, and a fan-out device for transitioning the optical fibers from the main cable to the breakout cable.

The fan-out device may include a fan-out housing that includes oppositely positioned first and second housing ends and a fiber transition insert. The fiber transition insert may extend along a central insert axis between first and second opposite insert ends. The first insert end may face toward the main cable and the second inert end may face toward the breakout cables.

The fiber transition insert may define a plurality of transition slots that have lengths that extend from the first insert end to the second insert end. The plurality of transition slots may be circumferentially spaced about the central insert axis.

The fan-out housing may define an inner cavity for receiving the fiber transition insert. The inner cavity may include a cylindrical portion in which the fiber transition insert mounts and a tapered portion between the cylindrical portion and the first housing end of the fan-out housing. The tapered portion may be configured to narrow the inner cavity as the tapered portion extends toward the first housing end of the fan-out housing that mounts within the fan-out housing.

The fiber transition housing may be mechanically locked relative to the fan-out housing by a mechanical locking interface.

The optical fibers may be routed through the plurality of transition slots to transition from the main cable to the plurality of breakout cables.

A variety of additional aspects will be set forth in the description that follows. The aspects relate to individual features and to combinations of features. It is to be understood that both the foregoing general description and the following detailed description are exemplary and explana-

BRIEF DESCRIPTION OF THE DRAWINGS

The accompanying drawings, which are incorporated in and constitute a part of the description, illustrate several aspects of the disclosure. A brief description of the drawings is as follows:

FIG. 4 illustrates an exploded view of the fiber optic fan-out arrangement of FIG. 1 showing a fiber transition insert, fan-out housing, strain relief boot, optical cable, and breakout cables in accordance with the principles of the disclosure;

FIGS. 6-10 illustrate multiple views of the fiber transition insert of FIG. 4;

FIGS. 11-12 are cross-sectional views taken through the fan-out housing of FIG. 4;

DETAILED DESCRIPTION

The present invention now will be described more fully hereinafter with reference to the accompanying drawings, in which illustrative examples including inventive aspects in accordance with the principles of the present disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

A fiber optic cable typically includes a plurality of optic fibers. In some instances, fibers of the cable need to be accessed and/or managed. An optic fiber cable fan-out transition arrangement can be used to manage the fibers by fanning-out the fibers. The term "fanning-out" as used herein, in this context, references a process of organizing the fibers, typically by spreading them as the fibers pass through a transition arrangement.

Issues with cable fan-out approaches relate to the following: ease of assembly in the field, ease of determining proper fiber alignment in the assembly and ease of securing with a satisfactory fiber alignment. The issues further include protecting fibers once fanned out during assembly and subsequent operations.

Figure 1:
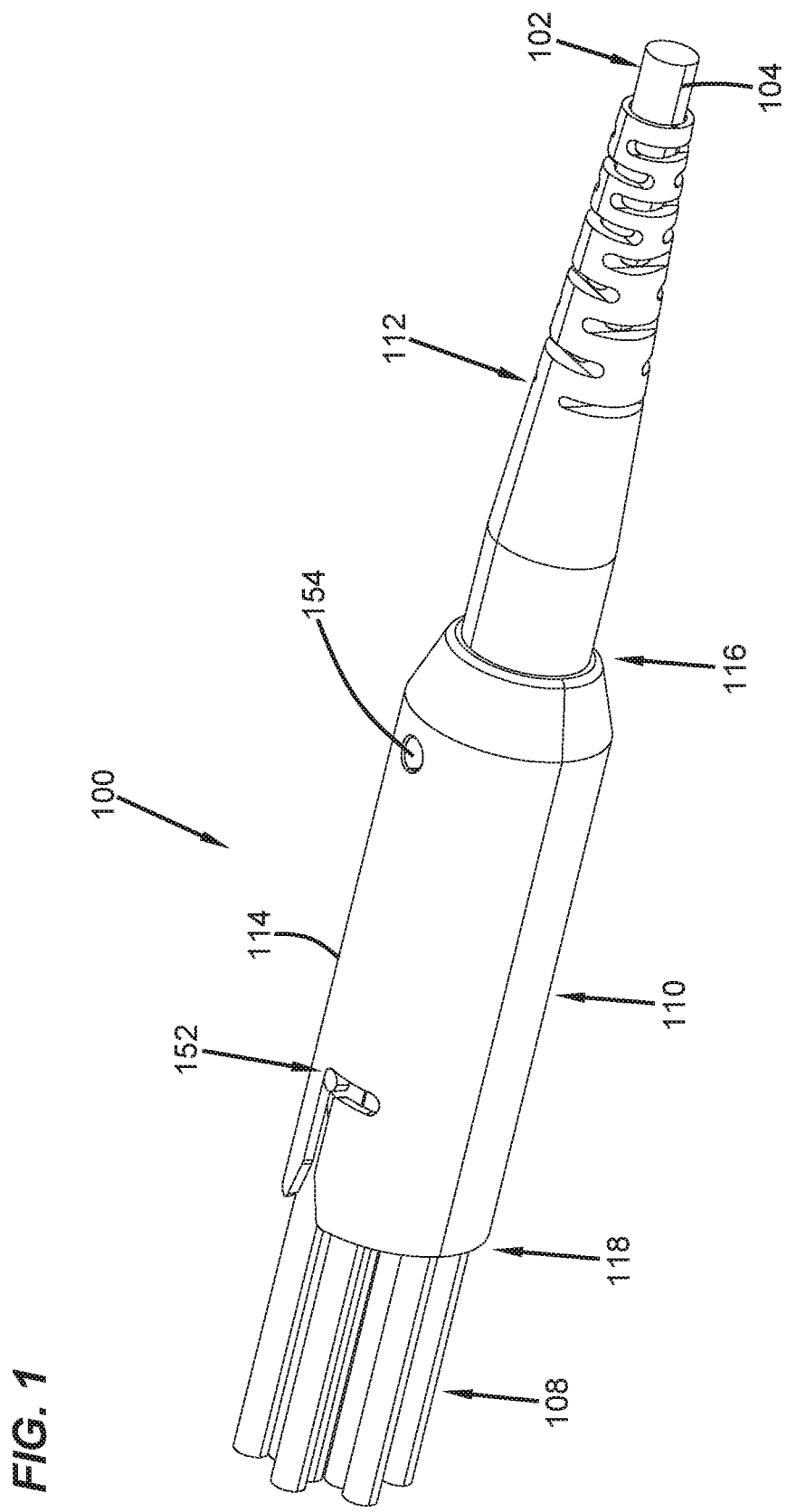
FIG. 1 illustrates a perspective view of an example fiber optic fan-out arrangement in accordance with principles of the disclosure.
Figure 2:
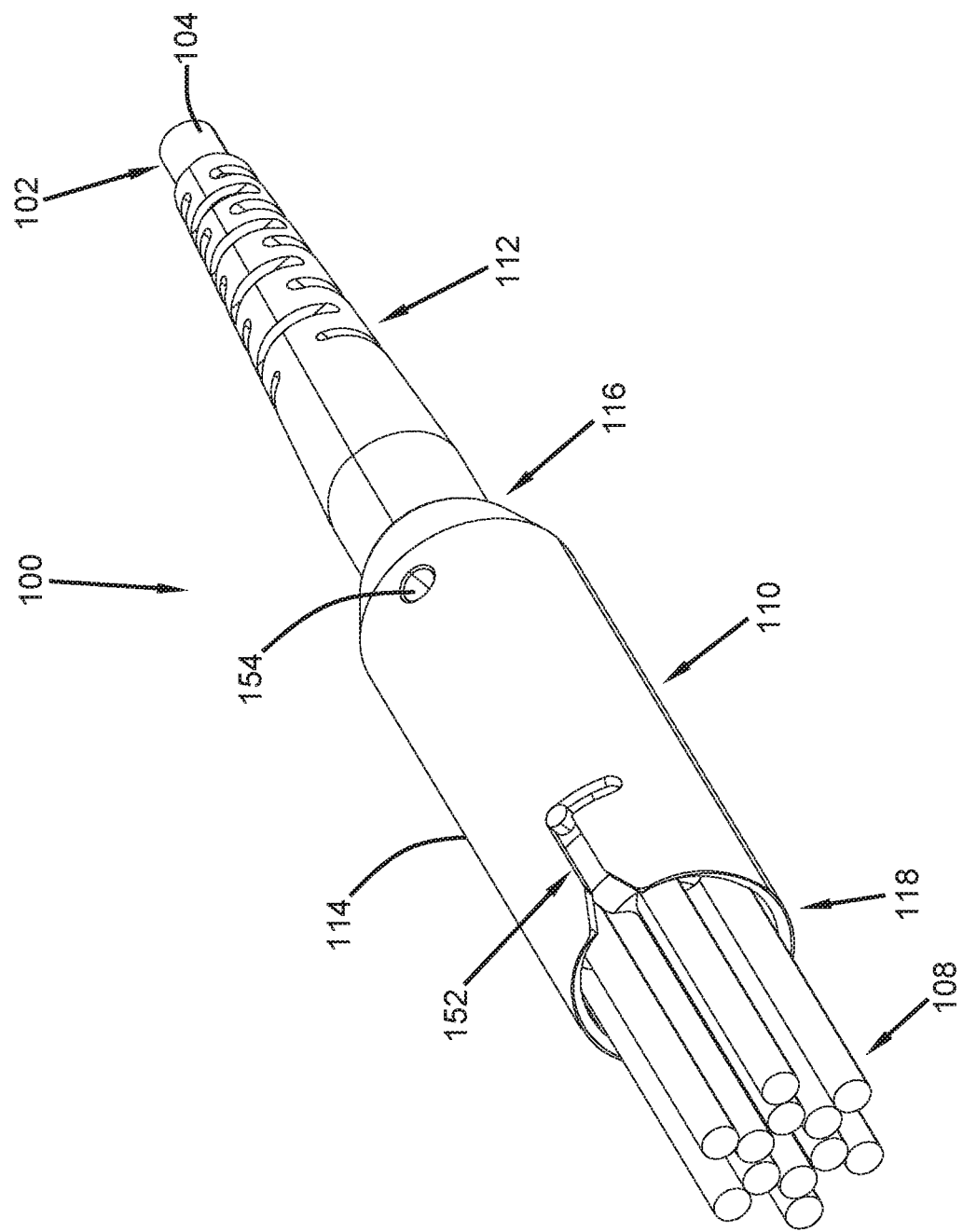
FIG. 2 illustrates a front perspective view of the fiber optic fan-out arrangement of FIG. 1.

Referring to FIGS. 1-2, a perspective representation of an example fiber optic fan-out arrangement 100 according to the disclosure is depicted. The fiber optic fan-out arrangement 100 may include a main cable 102 (e.g., a multi-fiber cable) that includes an outer jacket 104 containing a plurality of optical fibers 106 (see FIG. 3), a plurality of breakout cables 108 (e.g., output cables, furcation cables) that receive the optical fibers 106 of the main cable 102, a fan-out device 110 for transitioning the optical fibers 106 from the main cable 102 to the breakout cables 108, and a protective strain relief boot 112.

The fan-out device 110 may include a fan-out housing 114 that has a first housing end 116 and an oppositely, positioned, second housing end 118. The main cable 102 may be attached to the first housing end 116 and the break-out cables 108 may extend outwardly from the second housing end 118.

Figure 3A:
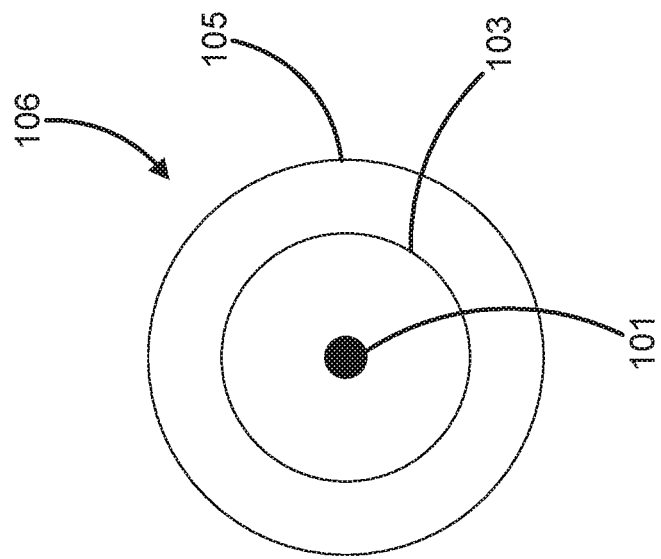
FIG. 3A illustrates a cross-sectional schematic view of an example optical fiber in accordance with the principles of the disclosure.
Figure 3:
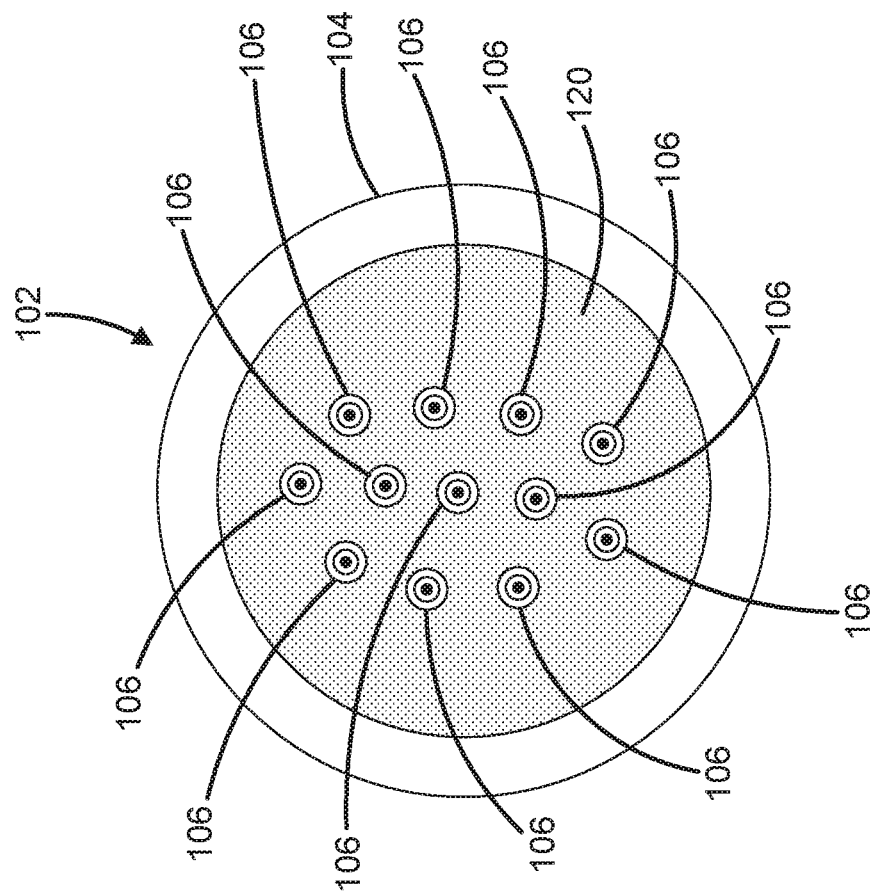
FIG. 3 illustrates a cross-sectional schematic view of an example optical cable suitable for routing to the fiber optic fan-out arrangement of FIG. 1.

FIG. 3 illustrates one example implementation of the main cable 102 suitable for routing to the fiber optic fan-out arrangement 100. In an example, the main cable 102 may be a 3 mm cable. The main cable 102 may be any length as desired. In certain examples, the main cable 102 may be several hundred feet long, although alternatives are possible. The main cable 102 may include outer jacket 104 that surrounds two or more optical fibers 106. In the example depicted, the outer jacket 104 surrounds twelve optical fibers 106. A tensile reinforcing structure 120 (e.g., strength structure) also is contained within the jacket 104. In an example, the tensile reinforcing structure 120 includes one or more strength members (e.g., aramid yarns) that extend through the jacket 104.

In some implementations, the optical fibers 106 may extend through one or more buffer tubes (not shown) within the jacket 104. For example, the optical fibers 106 may be tight-buffered, loose-buffered, or otherwise contained within the one or more buffer tubes.

FIG. 3A illustrates the example optical fiber 106. The optical fiber 106 may have a core 101 of about 8-12 microns, a cladding layer 103 of about 120-130 microns in outer diameter, and a coating layers 105 of about 190-260 microns in outer diameter. Other fiber constructions may be used as well.

Figure 3B:
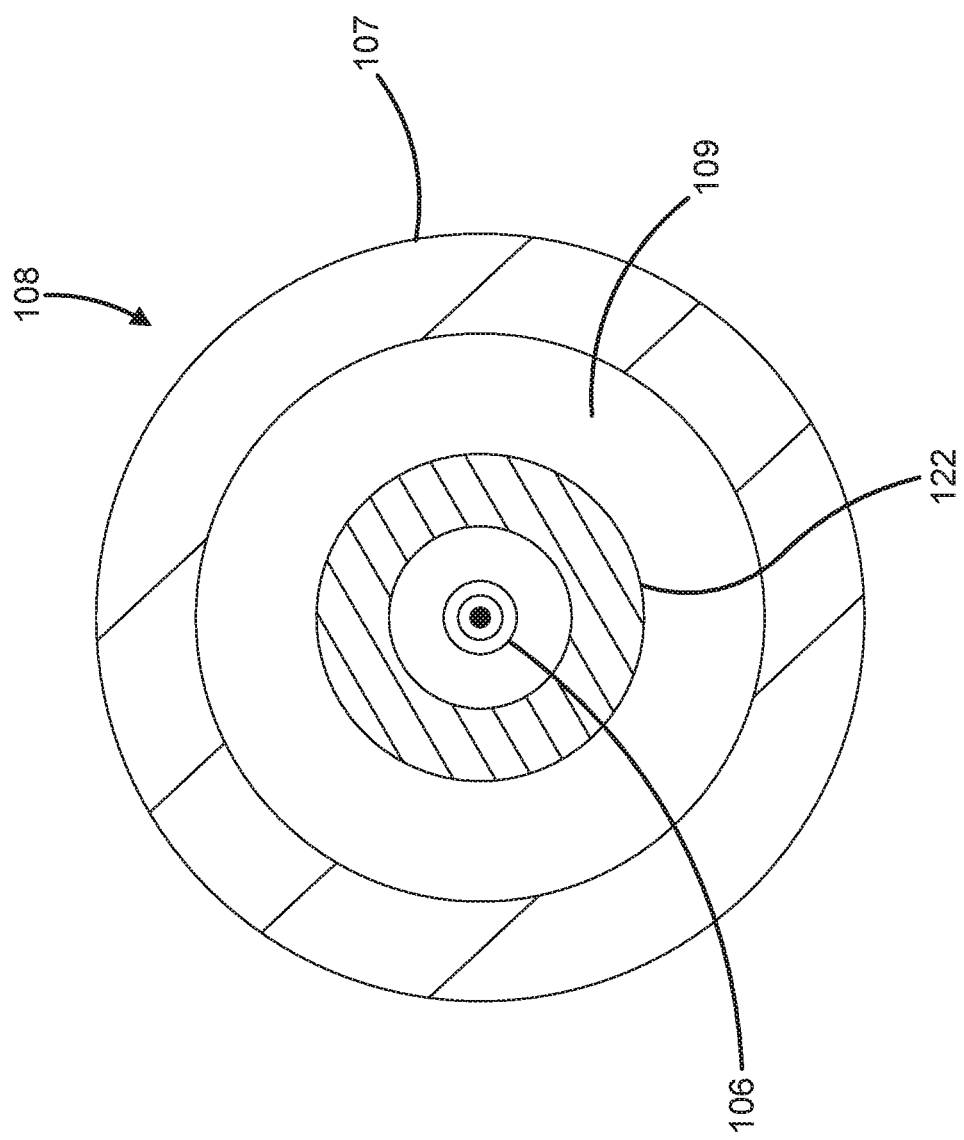
FIG. 3B illustrates a cross-sectional schematic view of an example breakout cable in accordance with the principles of the disclosure.

FIG. 3B illustrates the example breakout cable 108. In certain examples, the breakout cables 108 may be a furcation assembly that includes a furcation tube 107, an aramid layer 109 (strength layer), and a buffer tube 122 to receive the optical fiber 106. The furcation tube 107 may have an outer diameter of 2 mm. Typically, only one optical fiber 106 is received within each furcation tube 107, but alternatively two or more optical fibers 106 can be routed through each buffer tube 122. The buffer tube 122 may be about 900 microns in outer diameter. In certain examples, the buffer tube 122 may have an outer diameter in the range of 600-1200 microns or in the range of 800-1000 microns, and an inner diameter larger than 240 microns. The optical fiber 106 can be coated.

Referring to FIG. 4, the first housing end 116 of the fan-out housing 114 may include a cable anchoring stub 124 to which the main cable 102 is secured. The optical fibers 106 and the breakout cables 108 may extend outwardly from the fan-out device 110 to distal ends, which can be connectorized or unconnectorized or may each be adopted to be spliced to another fiber.

In certain examples, the tensile reinforcing structure 120 of the main cable 102 may be crimped to the cable anchoring stub 124 by a crimp band. The cable anchoring stub 124 may include ridges 126 for enhancing a retention force applied to the tensile reinforcing structure 120 by the crimp band. The protective strain relief boot 112 may mount over the crimp band.

The fan-out device 110 may also include a fiber transition insert 128 configured to mount within the fan-out housing 114. The fiber transition insert 128 may be inserted into the fan-out housing 114 through the second housing end 118. The fiber transition insert 128 may extend along a central insert axis 130 between a first insert end 132 and an opposite, second insert end 134. The first insert end 132 may face toward the main cable 102 and the second inert end 134 may face toward the breakout cables 108.

Figure 5:
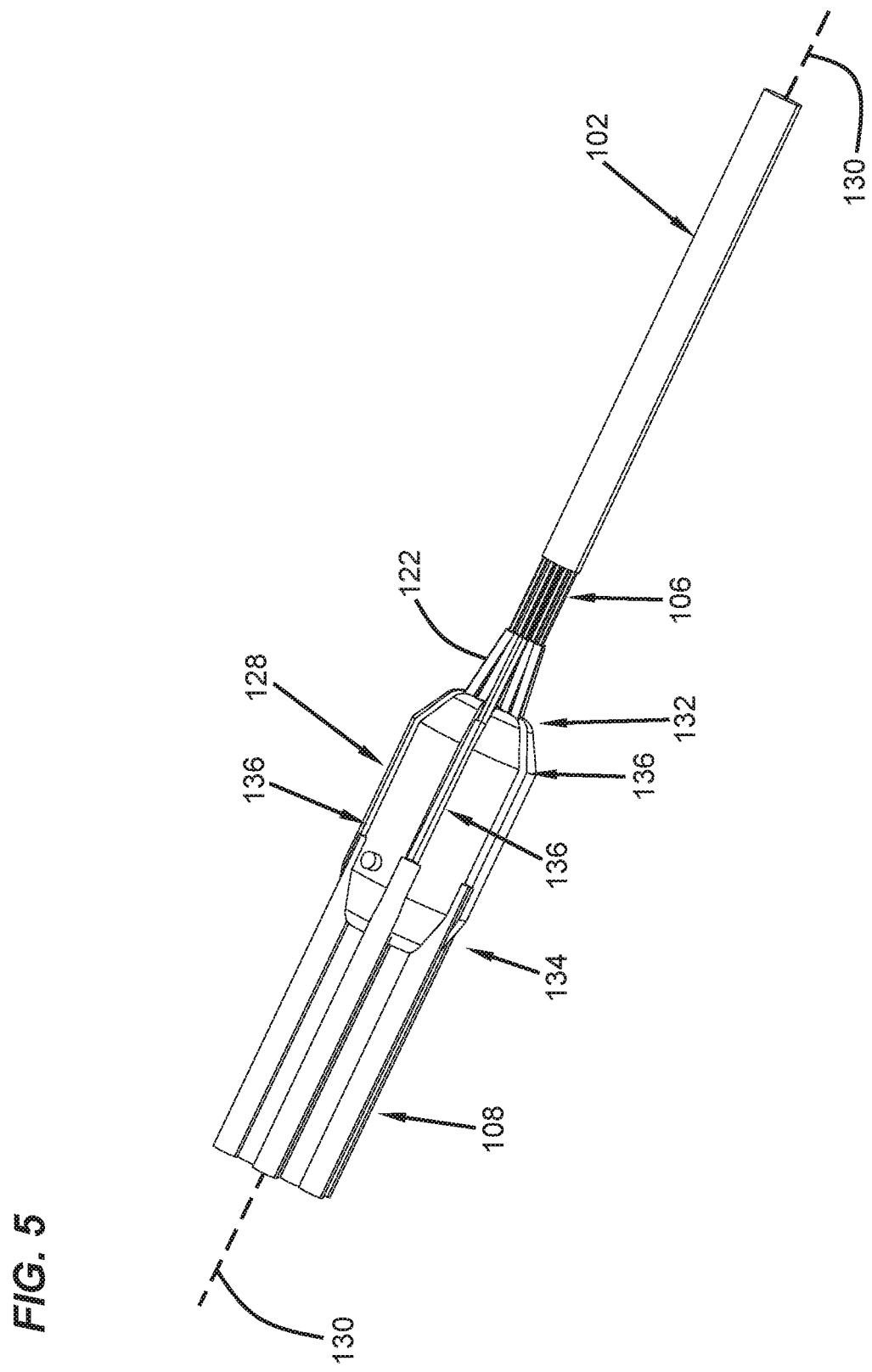
FIG. 5 illustrates a perspective view of the fiber transition insert of FIG. 4.
Figure 7:
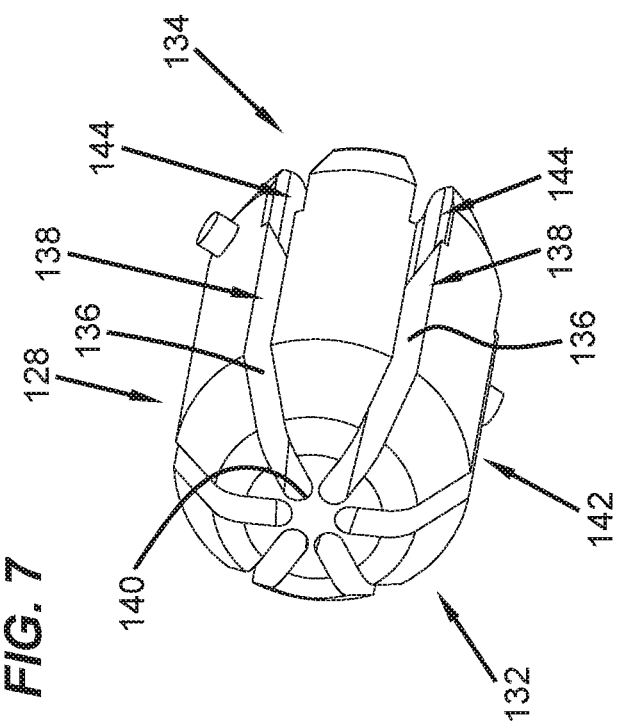
Figure 6:
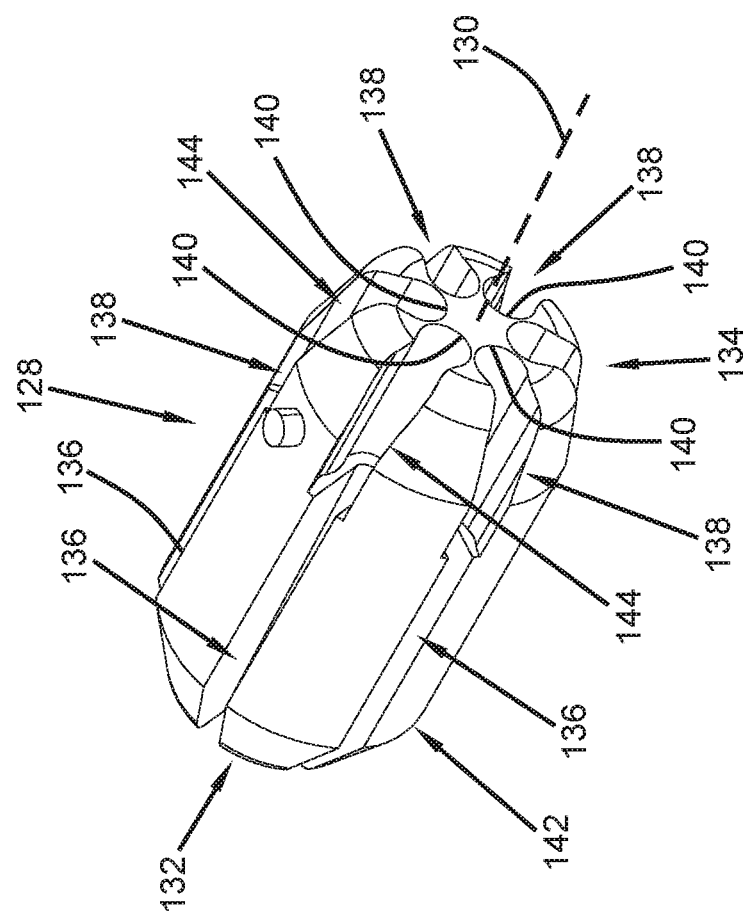

Turning to FIG. 5, the fiber transition insert 128 is depicted relative to the main cable 102 as it would appear (schematically) in use. The fiber transition insert 128 defines a plurality of transition slots 136 that have lengths L (see FIG. 9) that extend from the first insert end 132 to the second insert end 134.

Referring to FIGS. 6-10, multiple views of the fiber transition insert 128 are depicted without the main cable 102. The transition slots 136 may be circumferentially spaced about the central insert axis 130. The transition slots 136 may have transverse cross-sectional profiles with open ends 138 positioned opposite from closed ends 140. The transition slots 136 may have depths D (see FIG. 8) that extend radially with respect to the central insert axis 130 from the closed ends 140 to the open ends 138. The open ends 138 may face radially outwardly from the fiber transition insert 128 and can be located at an outer boundary 142 of the fiber transition insert 128. The outer boundary 142 of the fiber transition insert 128 may be tapered adjacent the first and second insert ends 132, 134, although alternatives are possible. In certain examples, the closed ends 140 of the transition slots 136 may converge toward the central insert axis 130 as the transition slots 136 extend toward the first insert end 132 (see FIG. 13).

Turning to FIG. 11, the transition slots 136 may include enlarged portions 144 (see FIG. 6) adjacent the second insert end 134 in which jackets and strength elements of the breakout cables 108 are anchored. That is, the aramid layer 109 may be anchored to the fan-out device 110 by adhesive applied in the transition slots 136 along with buffer tube 122. In one example, the jackets and strength elements of the breakout cables 108 can be anchored in the enlarged portions 144 of the transition slots 136 by adhesive, although alternatives are possible. In an example, two breakout cables 108 can mount in each of the transition slots 136 of the fiber transition insert 128. In one example, the breakout cables 108 can stack one on top of the other. In one example, the jackets can terminate at the enlarged portions 144, and the strength elements and buffer tubes can extend beyond the terminal ends of the jackets into the smaller portions of the transition slots 136 and can be fixed in the transition slots 136 by adhesive, such as epoxy.

Figure 12:
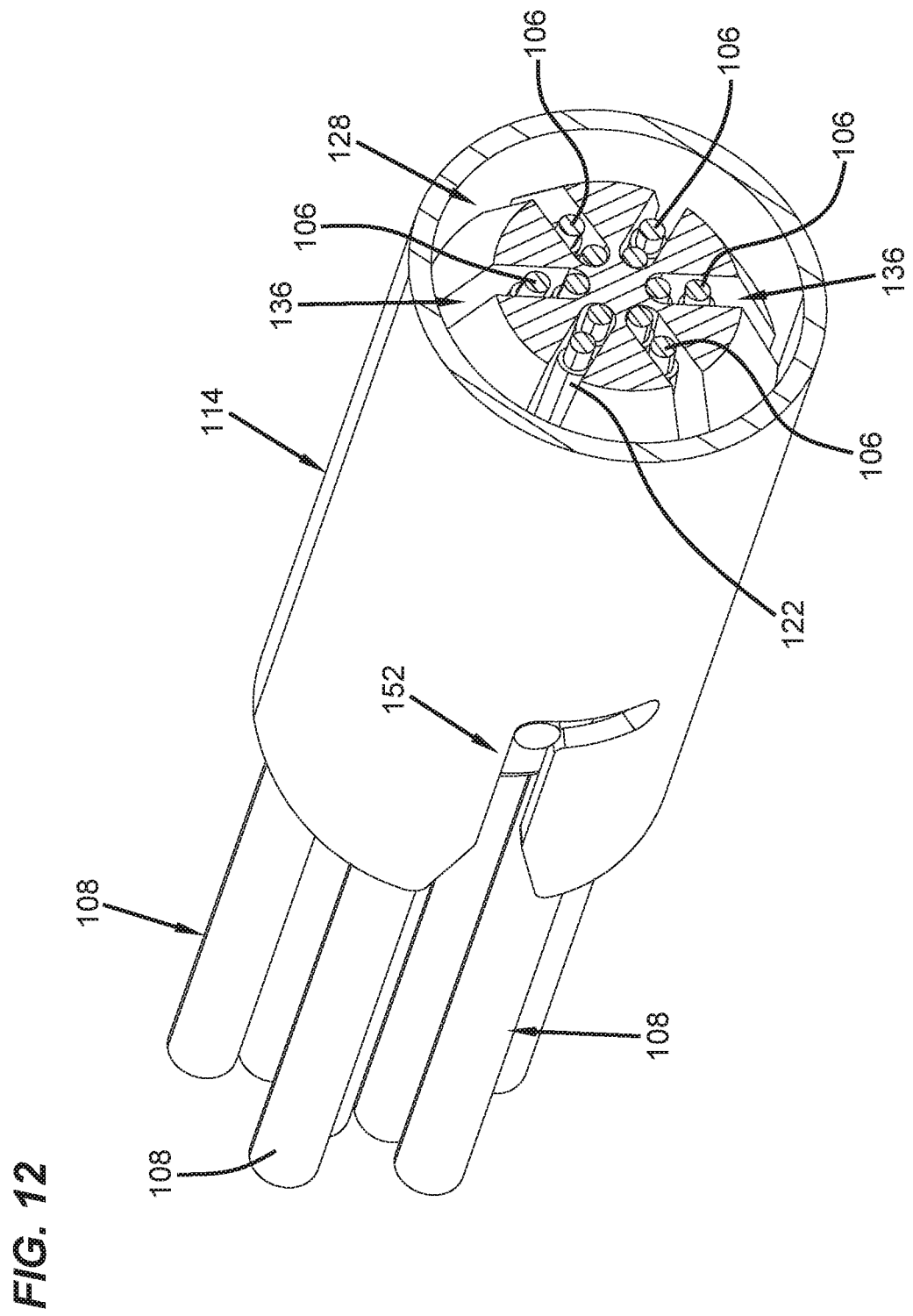

FIG. 12 shows the first insert end 132 with two buffer tubes 122 and optical fibers 106 mounted in each of the transition slots 136 of the fiber transition insert 128. The buffer tubes 122 are shown stacked one on top of the other.

Figure 13:
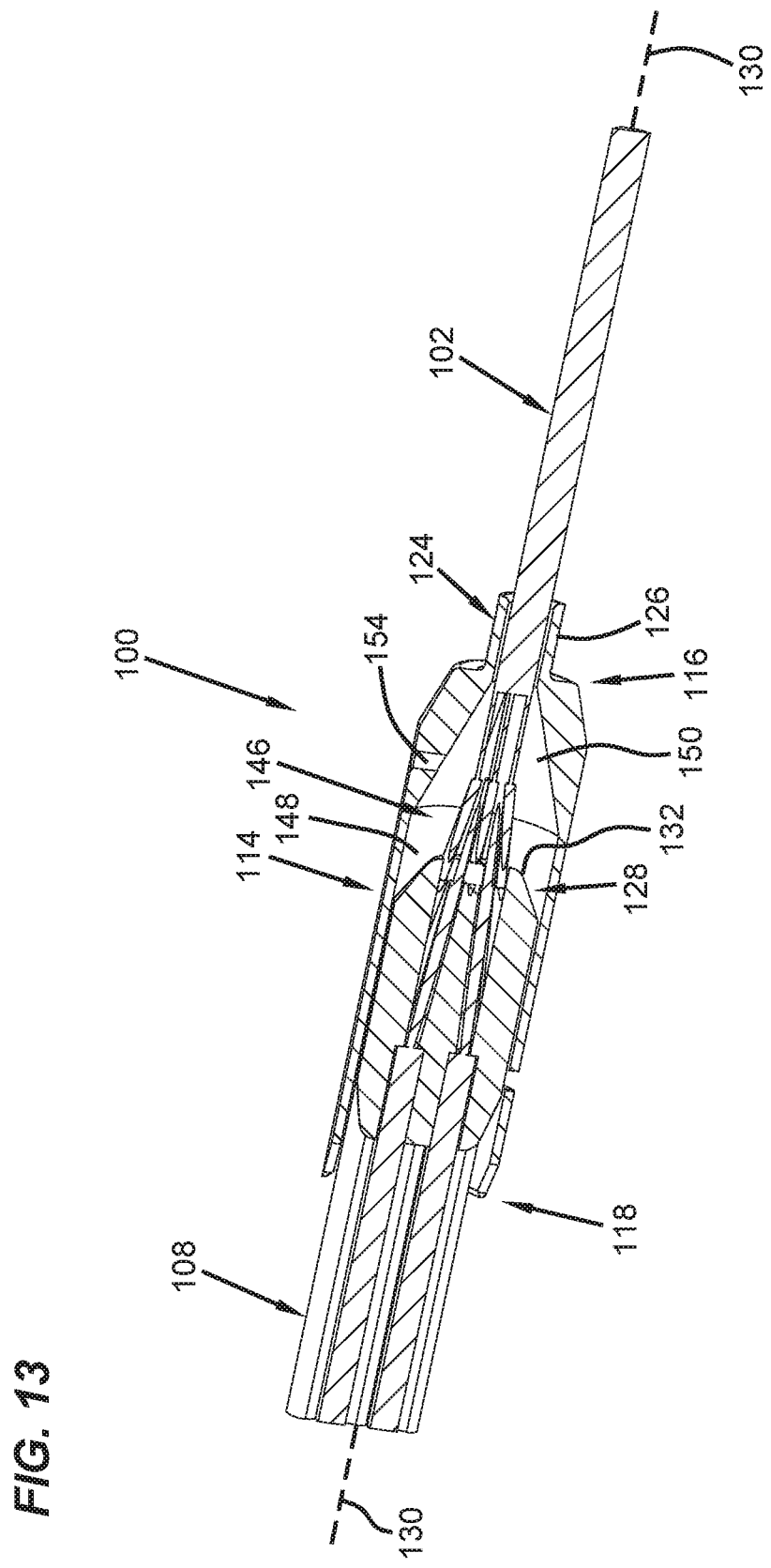
FIG. 13 illustrates a cross-sectional view of the fiber optic fan-out arrangement of FIG. 1.
Figure 14:
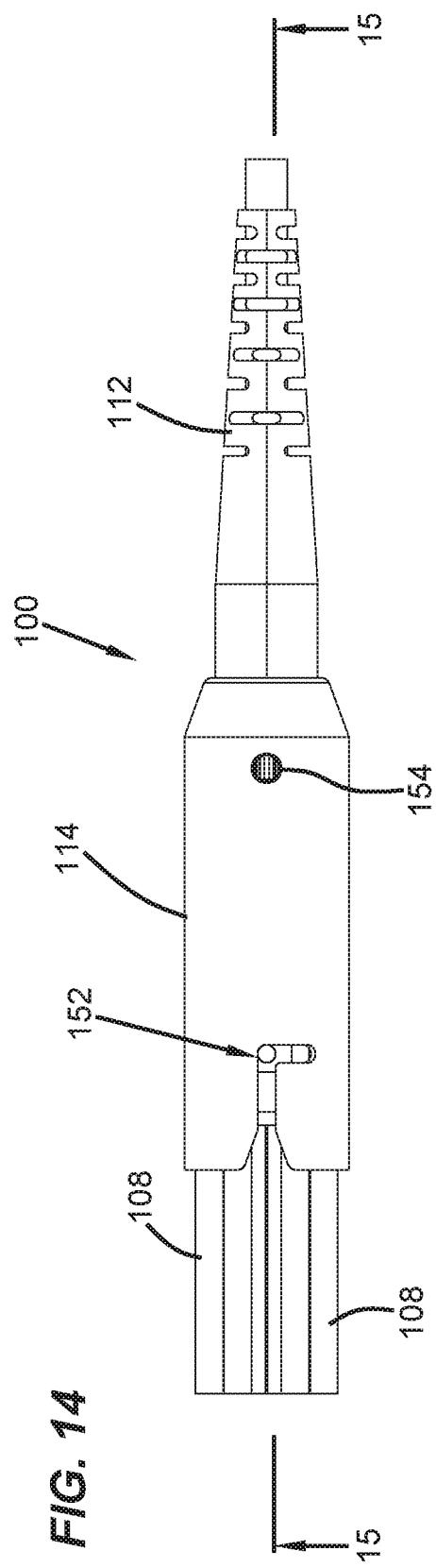
FIG. 14 illustrates a top view of the fiber optic fan-out arrangement of FIG. 1.
Figure 15:
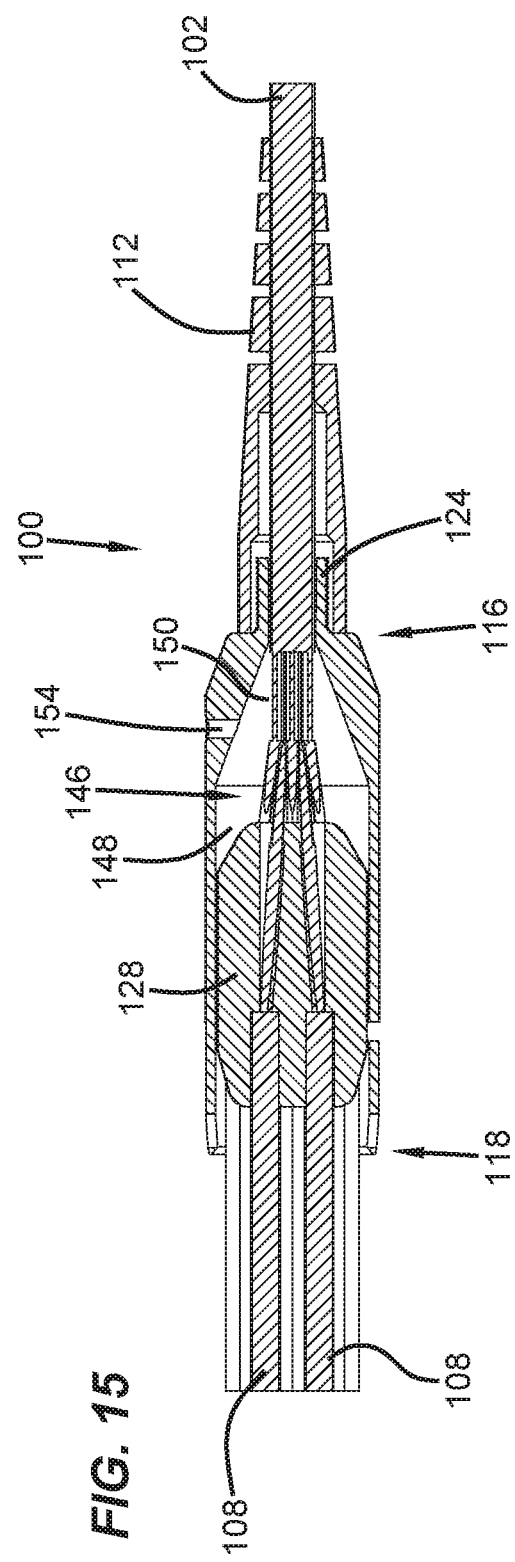
FIG. 15 illustrates a cross-sectional view taken along section line 15-15 of the fiber optic fan-out arrangement of FIG. 14.

Turning to FIGS. 13-15, the optical fibers 106 may be routed through the transition slots 136 to transition from the main cable 102 to the breakout cables 108. The fan-out housing 114 defines an inner cavity 146 that may be adapted to receive the fiber transition insert 128. The inner cavity 146 of the fan-out housing 114 may include a cylindrical portion 148 in which the fiber transition insert 128 mounts. The inner cavity 146 of the fan-out housing 114 may also include a tapered portion 150 between the cylindrical portion 148 and the first housing end 116 of the fan-out housing 114.

In certain examples, the fiber transition insert 128 may be mechanically locked relative to the fan-out housing 114 by a mechanical locking interface 152 (see FIG. 14). In one example, the mechanical locking interface 152 includes a bayonet interface, although alternatives are possible. In certain examples, the mechanical locking interface 152 may be a snap-fit connection interface. In certain examples, the mechanical locking interface 152 may be a threaded interface.

In certain examples, the fan-out housing 114 and the fiber transition insert 128 may be molded plastic parts, although alternatives are possible.

The fan-out housing 114 may be optionally filled with adhesive (e.g., epoxy). In certain examples, the fan-out housing 114 may define a side port 154 for filling the fan-out housing 114 with adhesive after the fiber transition insert 128 has been mechanical secured in the fan-out housing 114.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A fan-out arrangement comprising:
a main cable including a jacket containing a plurality of optical fibers;
a plurality of breakout cables that receive the optical fibers of the main cable; and
a fan-out device for transitioning the optical fibers from the main cable to the breakout cables, the fan out device including:
a fan-out housing including oppositely positioned first and second housing ends, wherein the main cable is attached to the first housing end and the break-out cables extend outwardly from the second housing end; and
a fiber transition insert that mounts within the fan-out housing, the fiber transition insert being inserted into the fan-out housing through the second housing end and being mechanically locked relative to the fan-out housing by a mechanical locking interface, the fiber transition insert extending along a central insert axis between first and second opposite insert ends, the first insert end facing toward the main cable and the second insert end facing toward the breakout cables, the fiber transition insert defining a plurality of transition slots having lengths that extend from the first insert end to the second insert end, the transition slots being circumferentially spaced about the central insert axis, the transition slots having transverse cross-sectional profiles having open ends positioned opposite from closed ends, the transition slots having depths that extend radially with respect to the central insert axis from the closed ends to the open ends, the open ends facing radially outwardly from the fiber transition insert and being located at an outer boundary of the fiber transition insert, the optical fibers being routed through the transition slots to transition from the main cable to the breakout cables;

wherein the transition slots include enlarged portions adjacent the second insert end in which jackets and strength elements of the breakout cables are anchored.

2. The fan-out arrangement of claim 1, wherein the mechanical locking interface includes a bayonet interface.

3. The fan-out arrangement of claim 1, wherein the closed ends of the transition slots converge toward the central insert axis as the transition slots extend toward the first insert end.

4. The fan-out arrangement of claim 1, wherein the strength elements include aramid yarn, and wherein the jackets and strength elements of the breakout cables are anchored in the enlarged portions of the transition slots by adhesive material.

5. The fan-out arrangement of claim 1, wherein the first housing end includes a cable anchoring stub to which the main cable is secured.

6. The fan-out arrangement of claim 5, wherein a strength structure of the main cable is crimped to the cable anchoring stub by a crimp band.

7. The fan-out arrangement of claim 6, wherein the cable anchoring stub includes ridges for enhancing a retention force applied to the strength structure by the crimp band.

8. The fan-out arrangement of claim 7, wherein the strength structure includes aramid yarn and a strain relief boot mounts over the crimp band.

9. The fan-out arrangement of claim 1, wherein the fan-out housing and the fiber transition insert are molded plastic parts.

10. The fan-out arrangement of claim 1, wherein the fan-out housing is optionally fillable with adhesive.

11. The fan-out arrangement of claim 10, wherein the adhesive is epoxy.

12. The fan-out arrangement of claim 1, wherein the fan-out housing defines a side port for filling the fan-out housing with adhesive after the fiber transition insert has been mechanically secured in the fan-out housing.

13. The fan-out arrangement of claim 1, wherein the outer boundary of the fiber transition insert is tapered adjacent the first and second insert ends.

14. The fan-out arrangement of claim 1, wherein the fan-out housing defines an inner cavity for receiving the fiber transition insert, the inner cavity including a cylindrical portion in which the fiber transition insert mounts and a tapered portion between the cylindrical portion and the first end of the fan-out housing, the tapered portion being configured to narrow the inner cavity as the tapered portion extends toward the first end of the fan-out housing.

15. A kit comprising:
a main cable including a jacket containing a plurality of optical fibers;
a plurality of breakout cables that receive the optical fibers of the main cable; and
a fan-out device for transitioning the optical fibers from the main cable to the plurality of breakout cables, the fan-out device including:
a fan-out housing including oppositely positioned first and second housing ends; and
a fiber transition insert, the fiber transition insert extending along a central insert axis between first and second opposite insert ends, the first insert end facing toward the main cable and the second insert end facing toward the plurality of breakout cables, the fiber transition insert defining a plurality of transition slots having lengths that extend from the first insert end to the second insert end, the plurality of transition slots being circumferentially spaced about the central insert axis;
the fan-out housing defining an inner cavity for receiving the fiber transition insert, the inner cavity including a cylindrical portion in which the fiber transition insert mounts and a tapered portion between the cylindrical portion and the first housing end of the fan-out housing, the tapered portion being configured to narrow the inner cavity as the tapered portion extends toward the first housing end of the fan-out housing that mounts within the fan-out housing;
wherein the fiber transition insert is mechanically locked relative to the fan-out housing by a mechanical locking interface, the mechanical locking interface including mating interlock features between the fan-out housing and the fiber transition insert;
wherein the optical fibers are routed through the plurality of transition slots to transition from the main cable to the plurality of breakout cables; and
wherein the plurality of transition slots include enlarged portions adjacent the second insert end in which jackets and strength elements of the breakout cables are anchored.

16. The kit of claim 15, wherein the mechanical locking interface includes a bayonet interface.

17. The kit of claim 15, wherein a side port is defined in the fan-out housing for filling the fan-out housing with adhesive after the fiber transition insert has been mechanically secured in the fan-out housing.

18. A fan-out arrangement comprising:
a main cable including a jacket containing a plurality of optical fibers;
a plurality of breakout cables that receive the plurality of optical fibers of the main cable; and
a fan-out device for transitioning the optical fibers from the main cable to the breakout cables, the fan out device including:
a fan-out housing including oppositely positioned first and second housing ends, wherein the main cable is attached to the first housing end and the breakout cables extend outwardly from the second housing end; and
a fiber transition insert that mounts within the fan-out housing, the fiber transition insert being inserted into the fan-out housing through the second housing end and being mechanically locked relative to the fan-out housing by a mechanical locking interface, the fiber transition insert extending along a central insert axis between first and second opposite insert ends, the first insert end facing toward the main cable and the second insert end facing toward the plurality of breakout cables, the fiber transition insert defining a plurality of transition slots having lengths that extend from the first insert end to the second insert end, the transition slots being circumferentially spaced about the central insert axis, the plurality of transition slots having transverse cross-sectional profiles having open ends positioned opposite from closed ends, the plurality of transition slots having depths that extend radially with respect to the central insert axis from the closed ends to the open ends, the open ends facing radially outwardly from the fiber transition insert and being located at an outer boundary of the fiber transition insert, the plurality of optical fibers being routed through the plurality of transition slots to transition from the main cable to the plurality of breakout cables;
wherein upon installation of the fiber transition insert into the fan-out housing, the fiber transition insert has an open, exposed end at which the plurality of breakout cables are individually movable relative to one other.

19. The fan-out arrangement of claim 18, wherein the mechanical locking interface includes mating interlock features between the fan-out housing and the fiber transition insert.

* * * * *